(12) United States Patent
Billoint et al.

(10) Patent No.: US 12,437,792 B2
(45) Date of Patent: Oct. 7, 2025

(54) DATA LOGIC PROCESSING CIRCUIT INTEGRATED IN A DATA STORAGE CIRCUIT

(71) Applicant: COMMISSARIAT A L'ENERGIE ATOMIQUE ET AUX ENERGIES ALTERNATIVES, Paris (FR)

(72) Inventors: Olivier Billoint, Grenoble (FR); Laurent Grenouillet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 163 days.

(21) Appl. No.: 18/373,231

(22) Filed: Sep. 26, 2023

(65) Prior Publication Data

US 2024/0112715 A1 Apr. 4, 2024

(30) Foreign Application Priority Data

Sep. 30, 2022 (FR) ...................................... 2209986

(51) Int. Cl.
*G11C 11/22* (2006.01)
*H03K 19/20* (2006.01)

(52) U.S. Cl.
CPC ........ *G11C 11/221* (2013.01); *G11C 11/2259* (2013.01); *G11C 11/2273* (2013.01); *H03K 19/20* (2013.01)

(58) Field of Classification Search
CPC .............. G11C 11/221; G11C 11/2259; G11C 11/2273; G11C 13/0011; G11C 13/004; H03K 19/20
See application file for complete search history.

(56) References Cited

U.S. PATENT DOCUMENTS

| | | | |
|---|---|---|---|
| 2018/0012664 A1* | 1/2018 | Kwon | G11C 16/08 |
| 2019/0379852 A1* | 12/2019 | Akabori | H04N 25/78 |
| 2022/0236952 A1 | 7/2022 | Fujinami et al. | |
| 2023/0245698 A1* | 8/2023 | Dubreuil | G11C 13/0028 365/148 |

OTHER PUBLICATIONS

Hayashikoshi, et al., "Processing In-Memory Architecture with On-Chip Transfer Learning Function for Compensating Characteristic Variation", 2020 IEEE International Memory Workshop (IMW), 2020.

* cited by examiner

*Primary Examiner* — Khamdan N. Alrobaie
(74) *Attorney, Agent, or Firm* — BakerHostetler

(57) ABSTRACT

A data storage circuit includes an array of memory cells; a logic processing circuit configured to carry out a logic operation having N binary data as operands stored in N input memory cells, with N≥2, the second input/output nodes of the input memory cells being linked by a common bit line, the logic processing circuit comprising: a transimpedance amplifier stage configured to supply an analogue read signal from the voltage of the common bit line; a comparator intended to compare the analogue read signal with a first adjustable reference voltage in order to generate a digital output signal corresponding to the result of the logic operation; a control unit configured to adjust the reference voltage to an amplitude selected from among N distinct predetermined amplitudes, depending on the type of logic operation.

15 Claims, 12 Drawing Sheets

Downward electric biasing
(x=0)

Upward electric biasing
(x=1)

Fig 2c

Logic operation Vs1_cmp = x1 AND x2 AND x3

| x1 | x2 | x3 | Vs1_cmp | Q |
|----|----|----|---------|-----|
| 0 | 0 | 0 | 0 | $Q_0 \simeq 0$ ← VREF1 |
| 0 | 0 | 1 | 0 | $Q_1$ |
| 0 | 1 | 0 | 0 | $Q_1$ |
| 1 | 0 | 0 | 0 | $Q_1$ ← VREF2 |
| 0 | 1 | 1 | 0 | $2 \times Q_1$ |
| 1 | 0 | 1 | 0 | $2 \times Q_1$ |
| 1 | 1 | 0 | 0 | $2 \times Q_1$ ← VREF_cmp=VREF3 |
| 1 | 1 | 1 | 1 | $3 \times Q_1$ |

Fig 2d

Logic operation Vs1_cmp = x1 OR x2 OR x3

| x1 | x2 | x3 | Vs1_cmp | Q |
|----|----|----|---------|-----|
| 0 | 0 | 0 | 0 | $Q_0 \simeq 0$ ← VREF_cmp=VREF1 |
| 0 | 0 | 1 | 1 | $Q_1$ |
| 0 | 1 | 0 | 1 | $Q_1$ |
| 1 | 0 | 0 | 1 | $Q_1$ ← VREF2 |
| 0 | 1 | 1 | 1 | $2 \times Q_1$ |
| 1 | 0 | 1 | 1 | $2 \times Q_1$ |
| 1 | 1 | 0 | 1 | $2 \times Q_1$ ← VREF3 |
| 1 | 1 | 1 | 1 | $3 \times Q_1$ |

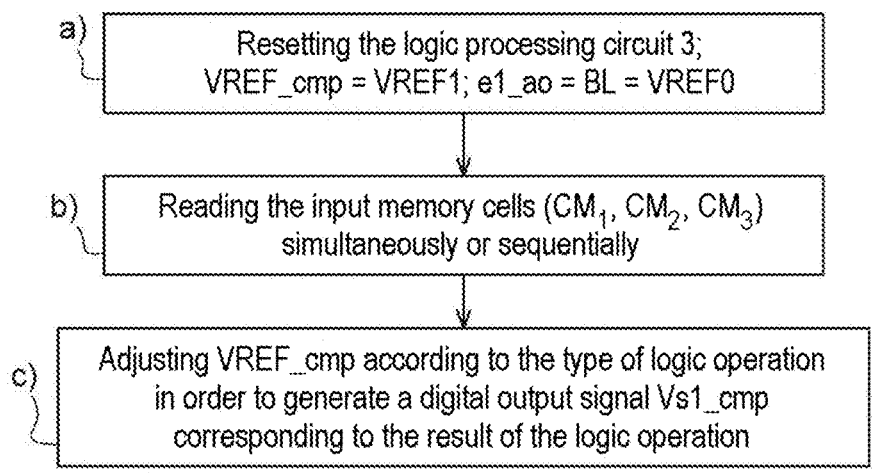

DATA LOGIC PROCESSING CIRCUIT INTEGRATED IN A DATA STORAGE CIRCUIT

CROSS-REFERENCE TO RELATED APPLICATION

This application claims priority to foreign French patent application No. FR 2209986, filed on Sep. 30, 2022, the disclosure of which is incorporated by reference in its entirety.

FIELD OF THE INVENTION

The invention generally relates to data storage circuits based on non-volatile memory cells. More specifically, the invention relates to the field of designing computational memory circuits or in-memory computing circuits. The invention relates to a data storage circuit allowing elementary Boolean logic operations to be carried out within the storage circuit itself.

BACKGROUND

In general, a system-on-chip comprises memory circuits for storing data and computing circuits for carrying out logic and arithmetic operations. Operations for exchanging data between the memory circuits and the computing circuits are highly energy consuming and reduce the computing performance capability of the system. In this context, emerging non-volatile memory technologies allow memory circuits to be produced that are capable of carrying out both the storage function and the computing function. This is known as an "in-memory computing circuit". This avoids having to transfer data between the storage means and the computing means, thereby reducing energy consumption and improving the computing speed.

However, the development of "in-memory computing circuit" solutions raises a number of challenges and constraints, such as:
- the use of large circuits peripheral to the memories for processing the results. This considerably increases the surface area of the circuit and the complexity of the physical implementation;
- constraints in terms of the accuracy of the completed computations. More specifically, this problem arises when executing algorithms requiring simultaneous computations.

By way of an example, in a conventional Von Neumann type architecture, up to 90% of the energy consumption is lost when transferring between the computing unit and the memory.

Therefore, a requirement exists for designing new architectures for in-memory computing circuits, which are less complex and at the same time offer reduced power consumption and an improvement in computing performance capabilities in terms of speed and precision.

The scientific publication entitled, "Processing In-Memory Architecture with On-Chip Transfer Learning Function for Compensating Characteristic Variation", by M. Hayashikoshi et al., discloses a data storage circuit configured to carry out logic processing in the memory array itself. The solution disclosed involves adding several supplementary transistors to each memory cell in order to link the memory points together in a predetermined connection. This has the disadvantage of considerably increasing the surface area occupied by the storage circuit. The increase in surface area generates additional manufacturing and integration costs.

Response to the Problem and Solution Provided

In order to address the aforementioned technical problems, the invention proposes a data storage circuit comprising a non-volatile memory array and a data processing circuit configured to read operands of said array and to carry out elementary logic operations from the read data without transferring the data outside the storage circuit. It is thus possible for a person skilled in the art to implement more complex algorithms from the elementary logic functions in the memory.

The operating principle of the data storage circuit according to the invention is compatible with a memory array of the variable electric biasing ferroelectric type or of the variable conductive filament resistive type or with a mixed resistive and capacitive memory array.

The device according to the invention can be produced with many more memory cells than in known solutions. This offers the advantage of multiplying storage and computing capacities at the same time. This allows a device to be acquired that is compatible with executing complex computing algorithms within the storage circuit itself. Furthermore, the device is capable of parallelizing a considerable number of data processing operations in order to achieve improved performance.

The invention further relates to a thin-film structure for producing the memory cells according to the invention. This elementary structure has the advantage of being compatible with the manufacturing techniques of the semiconductor industry. Thus, the device according to the invention has reduced production costs.

Moreover, in the specific case of ferroelectric type memories, an additional problem arises: reading the data corresponding to a high logic state ($x=1$) is destructive for said data. Within this context, the data processing circuit according to the invention allows makes it possible to rewrite the data read ($x=1$) in the memory cell after each read operation so as to perform a non-destructive read operation. The re-reading operation is fully integrated by the data processing circuit according to the invention. The data does not need to be copied back into buffer memories before reading, nor does said data need to be transferred to external circuits. This allows the complexity of implementing the storage circuit to be reduced. This also allows the energy consumption of the storage circuit to be reduced by limiting data exchanges at the input and/or at the output of the storage circuit.

SUMMARY OF THE INVENTION

The subject matter of the invention is a data storage circuit comprising:
- an array of memory cells such that each memory cell comprises:
  - a non-volatile elementary storage component having a first electrode and a second electrode;
  - a first input/output node connected to the second electrode, a second input/output node, a selection node; and
  - a selection transistor having a gate connected to the selection node and linking the first electrode to the second input/output node;
- a logic processing circuit configured to carry out a logic operation having N binary data as operands stored in N input memory cells, with N≥2, the second input/output nodes of said input memory cells being linked by a common bit line, the logic processing circuit comprising:
- a transimpedance amplifier stage configured to supply an analogue read signal from the voltage of the common bit line;
- a comparator intended to compare the analogue read signal with a first adjustable reference voltage in order to generate a digital output signal corresponding to the result of the logic operation;
- a control unit configured to adjust the reference voltage to an amplitude selected from among N distinct predetermined amplitudes, depending on the type of logic operation.

According to a particular aspect of the invention, the data storage circuit further comprises a sequencer configured to apply:
- a write and read control signal to the first input/output node of each of the input memory cells;
- a selection signal to the selection node of each of the input memory cells.

According to a particular aspect of the invention, the first input/output nodes of said input memory cells are linked by a common source line.

According to a particular aspect of the invention, the capacitive transimpedance amplifier stage comprises:
- an operational amplifier having: a first input connected to the second input/output node of the input memory cells, and a second input for receiving a second reference voltage, and an output for supplying said analogue read signal;
- a feedback impedance mounted between the output and the first input of the operational amplifier.

According to a particular aspect of the invention, the logic processing circuit further comprises a reset switch mounted between the output and the first input of the operational amplifier.

According to a particular aspect of the invention, the feedback impedance is a capacitive impedance and the elementary storage components of the input memory cells are of the variable electric biasing ferroelectric type. Each memory cell can have a first or a second logic state respectively corresponding to different levels of charges stored in the associated elementary storage component.

According to a particular aspect of the invention, each elementary storage component of the input memory cells has a first predetermined capacitance, and the feedback impedance is a capacitive element having a second capacitance that is more than N times said first predetermined capacitance.

According to a particular aspect of the invention, the N predetermined amplitudes are ordered in descending order, and the logic processing circuit is configured to carry out a logic operation by executing the following steps:
i) a step of resetting for discharging the capacitive element, biasing the first input of the operational amplifier to the second reference voltage and adjusting the first reference voltage to the maximum amplitude from among the N predetermined amplitudes;
ii) a step of reading a first input memory cell by setting its selection transistor to the on-state and applying a read control signal to its first input/output node having an amplitude substantially equal to the second reference voltage so as to generate a transfer of charges from the elementary storage component of the selected memory cell to its associated capacitive element;
iii) a step of adjusting, by the control unit, the first reference voltage by adjusting the amplitude of the first reference voltage to the next order of amplitude from among the N predetermined amplitudes when the binary data read in the previous step is in a high logic state;
iv) repeating steps ii) and iii) for the N input memory cells;
v) a step of adjusting, by the control unit, the first reference voltage to a predetermined value, according to the type of logic operation, from among the N amplitudes in order to generate a digital output signal corresponding to the result of the logic operation.

According to a particular aspect of the invention, each elementary storage component of the input memory cells has a first predetermined capacitance, and the feedback impedance is provided by N capacitive elements mounted in parallel, with each capacitive element being associated with an input memory cell and having a second capacitance greater than or equal to said first predetermined capacitance.

According to a particular aspect of the invention, the logic processing circuit is configured to carry out a logic operation by executing the following steps:
i') a step of resetting for discharging the capacitive elements, biasing the first input of the operational amplifier to the second reference voltage and adjusting the first reference voltage to the maximum amplitude from among the N predetermined amplitudes;
ii') a step of reading a first input memory cell by setting its selection transistor to the on-state and applying a read control signal to its first input/output node having an amplitude substantially equal to the second reference voltage so as to generate a transfer of charges from the elementary storage component of the selected memory cell to its associated capacitive element;
iii') repeating step ii') for the N input memory cells;
iv') a step of adjusting the first reference voltage to a predetermined value, according to the type of logic operation, from among the N amplitudes in order to generate a digital output signal corresponding to the result of the logic operation.

According to a particular aspect of the invention, the sequencer circuit is configured so as to apply, after reading a datum corresponding to the second logic state in a selected memory cell, a control signal to the first input/output node of said selected memory cell, having an amplitude below the second reference voltage and keeping the selection transistor of the selected memory cell in an on-state so as to restore, in its elementary storage component, a charge level corresponding to the second logic state.

According to a particular aspect of the invention, said first logic state corresponds to an uncharged state of an elementary storage component, and said sequencer circuit is such that, after reading a datum corresponding to a first logic state, said sequencer circuit is configured to make said selection transistor of the selected memory cell non-conductive before changing the control signal on the first input/output node to a new value, in order to keep the memory cell that has just been read in an uncharged state.

According to a particular aspect of the invention, the elementary storage component of an input memory cell is of the FeRAM type or of the ferroelectric tunnel junction (FTJ) type.

According to a particular aspect of the invention, the feedback impedance is a resistive impedance. The elementary storage components of the input memory cells are of the variable conductive filament resistive type.

According to a particular aspect of the invention, the logic processing circuit is configured to carry out a logic operation by executing the following steps:
  a) a step of resetting for biasing the first input of the operational amplifier to the second reference voltage and adjusting the first reference voltage to the maximum amplitude from among the N predetermined amplitudes;
  b) a step of reading the input memory cells, by setting their selection transistors to the on-state simultaneously or sequentially, and by applying a positive read control signal to their first input/output nodes;
  c) a step of adjusting, by the control unit, the first reference voltage to a predetermined value, according to the type of logic operation, from among the N amplitudes, in order to generate a digital output signal corresponding to the result of the logic operation.

According to a particular aspect of the invention, during the step of adjusting the first reference voltage according to the type of logic operation, the control unit is configured to adjust the first reference voltage to the minimum amplitude from among the N predetermined amplitudes when the logic operation is of the AND type.

According to a particular aspect of the invention, during the step of adjusting the first reference voltage according to the type of logic operation, the control unit is configured to adjust the first reference voltage to the maximum amplitude from among the N predetermined amplitudes when the logic operation is of the OR type.

BRIEF DESCRIPTION OF THE DRAWINGS

Further features and advantages of the present invention will become more clearly apparent from reading the following description with reference to the following appended drawings.

FIG. 2c illustrates the adjustment of the first reference voltage of the comparator of the processing circuit according to the first embodiment of the invention in order to carry out an AND type logic operation with three operands.

FIG. 2d illustrates the adjustment of the first reference voltage of the comparator of the processing circuit according to the first embodiment of the invention in order to carry out a logic operation of the OR type with three operands.

FIG. 6b illustrates the operating steps of the processing circuit according to the fifth embodiment of the invention for carrying out an elementary logic operation.

DETAILED DESCRIPTION

Figure 1A:
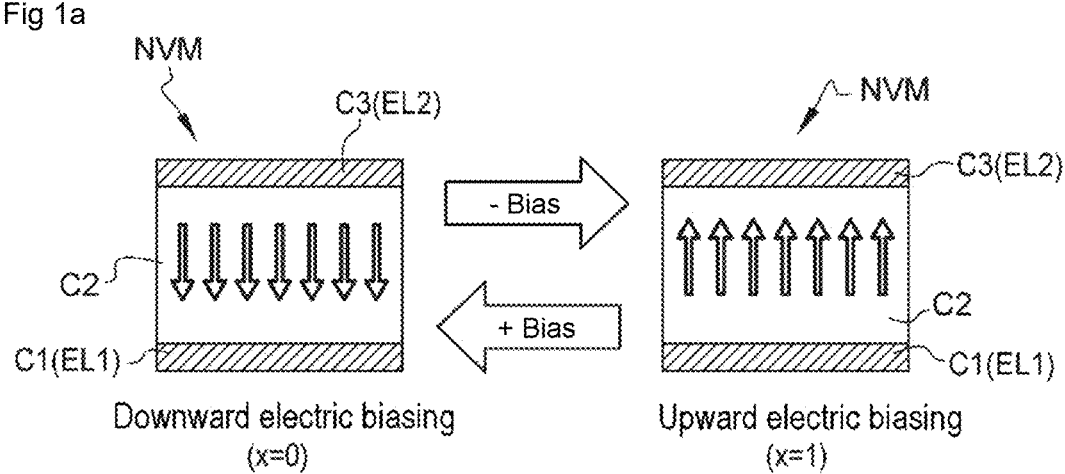
FIG. 1a illustrates a cross-sectional view of an example of an elementary component of a variable electric biasing ferroelectric memory cell compatible with the invention.

The invention is compatible with a memory array of the variable electric biasing ferroelectric type or of the variable conductive filament resistive type or an array with mixed resistive and capacitive memories. The invention will be initially described within the context of a storage circuit with memories of the variable electric biasing ferroelectric type. FIG. 1a shows a structural example of an elementary component NVM of a variable electric biasing ferroelectric memory cell, more specifically an FeRAM type component.

In the illustrated example, the elementary component NVM is made up of a stack of thin layers in the following order a first layer C1 made of an electrically conductive material forming a first electrode EL1; a second layer C2 made of a dielectric and ferroelectric material and a third layer C3 made of an electrically conductive material forming a second electrode EL2. The second layer C2 is called "central layer" throughout the remainder of the description.

The stack of thin layers forms an MIM (Metal-Insulator-Metal) type structure acting as a capacitive element with a capacitance C. The ferroelectric nature of the central layer C2 induces the following behaviour when a positive electric voltage is applied to the upper electrode EL2, the biasing of the electric dipoles of the central layer is directed in a "negative" direction. Conversely, when a positive electric voltage is applied to the lower electrode EL2, the biasing of the electric dipoles is directed in a "positive" direction. The direction of the electric biasing in the central layer C2 corresponds to a state of equilibrium that is maintained even in the absence of the electric field induced by the voltage applied to one of the electrodes EL1 or EL2, hence the ferroelectric memory operation.

Thus, the following convention is selected by way of an example: when a memory component NVM is configured to store binary data in the low logic state (x=0), a write electric voltage is temporarily applied to the upper electrode EL2 (illustrated by a + bias) so as to acquire a bias directed in a "negative" direction in the central layer C2. Conversely, when a memory component NVM is configured to store binary data in the high logic state (x=1), a write electric voltage is temporarily applied to the lower electrode EL1 (illustrated by a − bias) so as to acquire a bias directed in a "positive" direction in the central layer C2.

FIG. 1a illustrates a FeRAM type elementary component NVM compatible with the invention. It should be noted that it is also possible to produce the invention with elementary components of the FTJ (Ferroelectric Tunnel Junction) type and any other type of ferroelectric non-volatile memory technology with variable electric biasing.

Figure 1B:
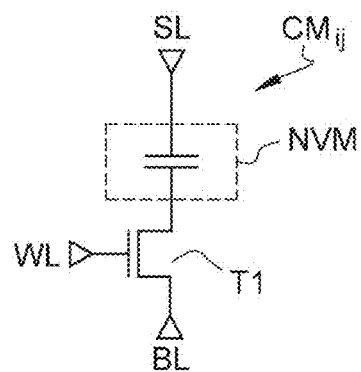
FIG. 1b illustrates an electric model of a variable electric biasing ferroelectric memory cell compatible with the invention.

FIG. 1b illustrates an electric diagram of a variable electric biasing ferroelectric memory cell $CM_{ij}$ compatible with the invention. The memory cell $CM_{ij}$ comprises an elementary memory component NVM, a selection transistor T1, a first input/output node SL, a second input/output node BL and a selection node WL. The memory cell $CM_{ij}$ is intended to be integrated into an array comprising a plurality of bit lines, a plurality of word lines and a plurality of source lines. The first input/output node SL is intended to be connected to a source line associated with the memory cell $CM_{ij}$. The second input/output node BL is intended to be connected to a bit line associated with the memory cell $CM_{ij}$. The selection node WL is intended to be connected to a word line associated with the memory cell $CM_{ij}$.

Within a memory cell $CM_{ij}$, the first input/output node SL is connected to the second electrode EL2 of the elementary memory component NVM. The selection transistor T1 has a gate connected to the selection node WL. The selection transistor T1 links the first electrode EL1 of the elementary memory component NVM to the second input/output node BL. The elementary component NVM acts as a capacitive element with a variable capacitance depending on the direction of the electric biasing of the central ferroelectric layer C2. The memory cell $CM_{ij}$ is thus modelled by a compact architecture 1C1T. This allows direct action on the electrodes EL1 and EL2 of the capacitive element when the transistor T1 is in the on-state.

Figure 2A:
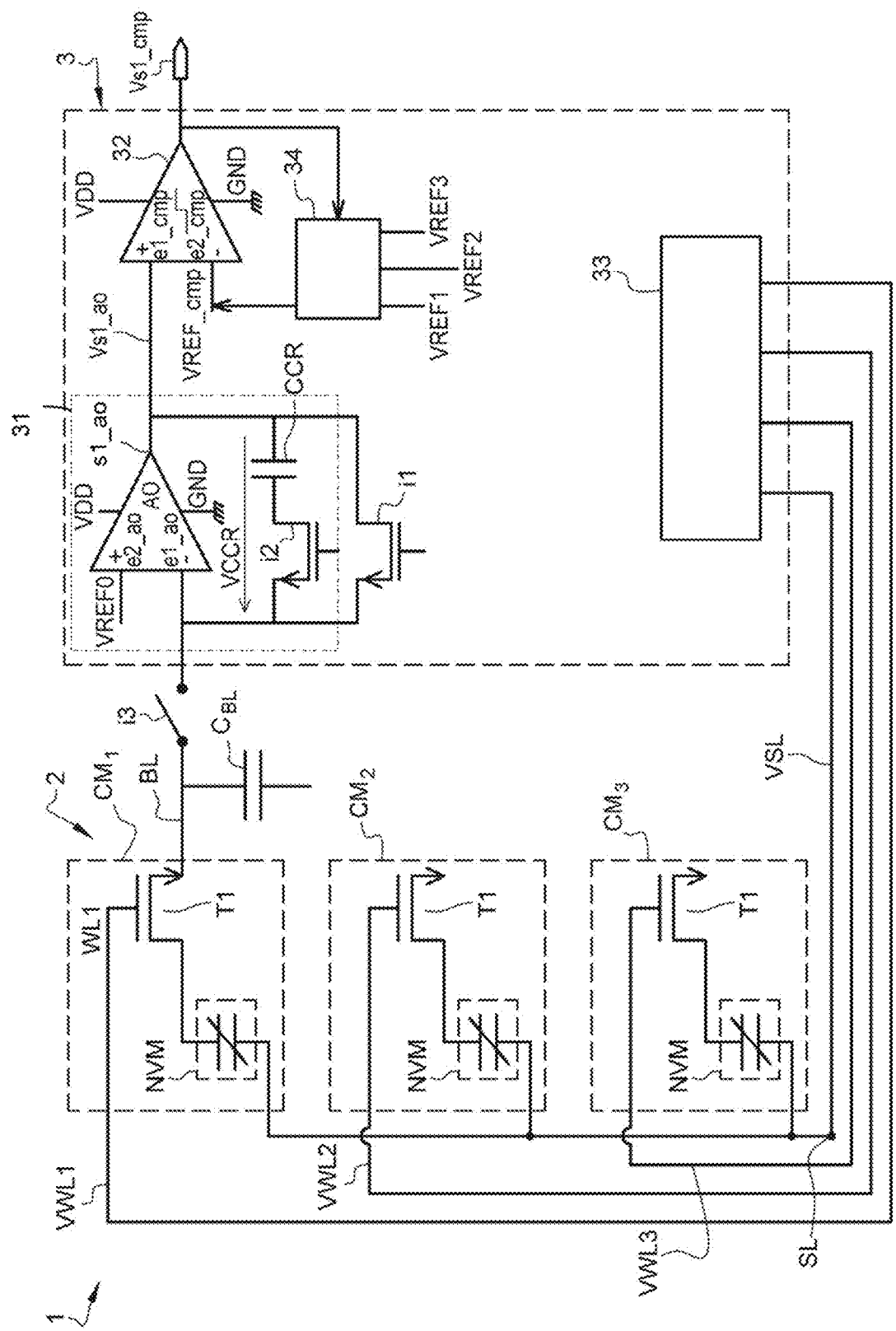
FIG. 2a illustrates an electric diagram of a first embodiment of the processing circuit according to the invention connected to N=3 variable electric biasing ferroelectric memory cells.

FIG. 2a illustrates an electric diagram of a first embodiment of the processing circuit according to the invention connected to N=3 variable electric biasing ferroelectric memory cells. The disclosure of a logic operation with N=3 operands is provided by way of an illustration and is not limiting. The invention allows elementary logic operations to be carried out for N>=2 operands stored in as many memory cells.

The storage circuit according to the invention comprises an array 2 of memory cells $CM_{ij}$ as described in FIGS. 1a and 1b and at least one data processing circuit 3. For the sake of simplicity, the entire memory array 2 is not shown and only the input memory cells $CM_1$, $CM_2$ and $CM_3$ respectively containing the input binary data x1, x2 and x3 are shown.

The input memory cells $CM_1$, $CM_2$ and $CM_3$ share the same bit line forming a second input/output node BL common to said cells. The input memory cells $CM_1$, $CM_2$ and $CM_3$ share the same source line forming a first input/output node SL common to said cells. The selection nodes WL1, WL2 and WL3 of each of the input memory cells $CM_1$, $CM_2$ and $CM_3$ are distinct.

The logic processing circuit 3 is connected to the second input/output node BL common to the input memory cells $CM_1$, $CM_2$ and $CM_3$ via an activation switch i3. The activation switch i3 allows the node BL to be isolated from the logic processing circuit 3 if necessary. The parasitic capacitance $C_{BL}$ experienced by the second input/output node BL is shown in this case in order to make it easier to understand the invention.

The logic processing circuit 3 comprises a capacitive transimpedance amplifier stage 31, a comparator 32, a control unit 34, a sequencer circuit 33 and a reset switch i1.

In general, the transimpedance amplifier stage 31 is configured to supply an analogue read signal Vs1_ao for each of the operands x1, x2, x3. The comparator 32 is configured to compare the analogue read signal Vs1_ao with a first adjustable reference voltage VREF_cmp in order to generate a digital output signal Vs1_cmp. The control unit 34 is configured to adjust the first reference voltage VREF_cmp to an amplitude selected from among N=3 predetermined amplitudes VREF1, VREF2, VREF3, such that VREF1>VREF2>VREF3.

According to the first embodiment of the invention, the capacitive transimpedance amplifier stage 31 comprises an operational amplifier AO associated with a capacitive feedback impedance (CCR). The operational amplifier AO has a first input e1_ao connected to the second input/output node BL of the input memory cells, a second input e2_ao for receiving a second reference signal VREF0, and an output s1_ao for supplying said analogue read signal Vs1_ao. The capacitive feedback impedance CCR is mounted between the output s1_ao and the first input e1_ao of the operational amplifier. This type of mounting allows the amount of charge contained in the elementary component NVM to be read directly, rather than reading a voltage variation on the node BL. This mounting thus allows a read operation to be carried out with accuracy that is independent of the parasitic capacitance $C_{BL}$.

In the illustrated embodiment, the capacitive feedback impedance CCR is produced by a single capacitive element Cap1. The function of the capacitive feedback impedance CCR is to convert the amount of charge supplied by the elementary component NVM (equivalent to a capacitive element) into an electric voltage applied between the output s1_ao and the input e1_ao. Let Q be the amount of charge supplied by an input memory cell storing data in a high logic state. In the case whereby the logic processing circuit 3 is intended to carry out logic operations with N operands, the capacitive element Cap1 is able to receive an amount of charge that is greater than or equal to N×Q. In other words, if the elementary component NVM of each input memory cell with a capacitance equal to C0 is assimilated, the capacitance C1 of the capacitive element Cap1 is greater than or equal to N×C0.

The operational amplifier AO has a dual function:
- to maintain the node BL at a fixed potential equal to the potential of the second reference signal VREF0 when the read activation switch i3 is in the on-state;
- to generate an analogue read signal Vs1_ao having an amplitude dependent on the amount of charge transmitted from the elementary component NVM to the capacitive feedback impedance CCR during a cell reading operation and during an elementary logic operation computing step.

The comparator 32 has a first input e1_cmp connected to the output s1_ao of the operational amplifier, a second input e2_cmp for receiving said first adjustable reference signal VREF_cmp, and an output s1_cmp for supplying a digital read signal Vs1_cmp resulting from comparing the analogue read signal Vs1_ao with the first adjustable reference signal VREF_cmp.

The control unit 34 is configured to control the amplitude of the first reference voltage VREF_cmp when executing a predetermined elementary logic operation. This is a circuit configured according to a state machine implemented using logic gates. The action of the control unit 34 on the first reference voltage VREF_cmp will be described in a subsequent section.

Optionally, the processing circuit 3 comprises a first feedback activation switch i2 between the capacitive feedback impedance CCR and the first input e1_ao of the operational amplifier.

The comparator 32 and the operational amplifier AO are each biased by a supply voltage VDD and the electric ground GND.

The sequencer circuit 33 is configured to control the application:
- of a write and read control signal VSL on the first input/output node SL of the associated memory cell; and
- of a selection signal VWL1, VWL2, VWL3 on each selection node WL1, WL2 and WL3 of the input memory cells.

The reset switch i1 is mounted between the output s1_ao and the first input e1_ao of the operational amplifier. When the reset switch i1 is in the on-state, the capacitive feedback impedance CCR is discharged. This discharge also causes the analogue output signal Vs1_ao to be reset to a potential equal to that of the second reference signal VREF0.

Advantageously, closing the reset switch i1 dissipates the charges accumulated on the second input/output node BL due to leakage currents. Indeed, for advanced technology nodes, there is an increase in leakage currents originating from the gates of the transistors of the operational amplifier AO connected to the second input/output node BL. These leakage currents lead to an accumulation of charges in the parasitic capacitor $C_{BL}$. This leads to potential fluctuations at the second input/output node BL. Hence the specific advantage of the reset switch i1 in this case.

All the switches i1, i2 and i3 are controlled by control means that are not shown so as to simplify the illustration. The switches i1, i2 and i3 are produced by CMOS transistors by way of an example.

In order to carry out an elementary logic operation having the data x1, x2 and x3 as operands, the logic processing circuit 3 according to the first embodiment is configured to carry out the steps shown in the flowchart of FIG. 2a. The switch i3 is closed in order to establish the connection between the input memory cells and the logic processing circuit 3.

The first step (i) is a reset step acquired by the following configuration: the reset switch i1 and the feedback activation switch i2 are closed. The sequencer 33 generates a selection signal VWL so as to set the selection transistor T1 to an off-state. The sequencer 33 generates a write and read control signal VSL on the first input/output node SL equal to electric ground. In addition, the control unit 34 is configured to adjust the first reference voltage VREF_cmp to the maximum amplitude VREF1. The maximum amplitude is used to detect a minimum amplitude variation of the analogue output voltage Vs1_ao when a high logic state is read.

This step (i) allows the capacitive feedback impedance CCR to be discharged and the first input e1_ao of the operational amplifier to be biased to the second reference signal VREF0. Thus, following the reset, the input/output node BL and the output s1_ao are biased to the second reference signal VREF0 (VBL=Vs1_ao=VREF0), the voltage at the terminals of the capacitive feedback impedance CCR is zero, the reference voltage of the comparator 32 is at VREF1, and the output of the comparator s1_cmp is in a low logic state (Vs1_cmp=0).

The second step (ii) is a step of reading the first input memory cell $CM_1$. The reset switch i1 is open, the switches i2 and i3 are closed (on-state) and only the selection transistor T1 of the first input memory cell $CM_1$ is in the on-state. During this step, the sequencer 33 is configured to apply a selection signal VWL1 allowing the selection transistor T1 to be set to the on-state (a rising edge in the case of an NMOS, for example). The selection transistors of the second and third input memory cells are kept in the off-state. This results in the creation of a connection path between the elementary component NVM and the capacitive feedback element CCR.

In addition, the sequencer 33 is configured to apply a positive read control signal VSL to the first input/output node SL. This results in the application of a quasi-zero potential difference at the terminals of the elementary component NVM. Thus, the combination of the quasi-zero voltage at the terminals of the elementary component NVM and its connection to the capacitive feedback element CCR induces a transfer of charges previously stored in the elementary component NVM to the capacitive feedback element CCR. The amount of charge that is transferred depends on the logic state previously stored in the first input memory $CM_1$. This induces a variation in the electric voltage VCCR at the terminals of the capacitive feedback impedance CCR. The value of the electric voltage at the terminals of the capacitive feedback impedance CCR depends on the amount of charge supplied by the elementary component NVM. This causes a variation in the analogue output signal Vs1_ao, which changes to VREF0−VCCR.

The amplitude VREF1 is selected so as to achieve the behaviour described hereafter according to the content of an input memory cell in the read phase. In the case whereby x=1 is stored in the elementary component NVM, Vs1_ao=VREF0−VCCR<VREF1 is acquired, with VCCR of the order of a few hundred millivolts. Thus, Vs1_cmp=VDD is acquired, corresponding to a high logic level. Conversely, in the case whereby x=0 is stored in the elementary component NVM, Vs1_ao=VREF0−VCCR>VREF1 is acquired and therefore Vs1_cmp=GND is acquired, corresponding to a low logic level. In the case illustrated, the comparator 32 is an inverting comparator circuit. Conversely, implementing a non-inverting comparator circuit can be contemplated depending on the design choices of a person skilled in the art.

It should be noted that the charges are fully transferred to the capacitive feedback impedance CCR during this step. The parasitic capacitance $C_{BL}$ does not receive these charges because it is kept at a voltage equal to VREF0 by virtue of the operational amplifier AO throughout the entire operation. The processing circuit 3 according to the invention thus allows a read operation to be carried out in the charge domain independent of the value of the parasitic capacitance $C_{BL}$.

As a result, the following configuration is acquired on completion of step ii): in the case whereby x=0 is stored in the elementary component NVM, a quasi-zero amount of charge $Q_0$ is accumulated in the capacitive feedback impedance CCR. In the case whereby x=1 is stored in the elementary component NVM, an amount of charge $Q_1 \gg Q_0$ is accumulated in the capacitive feedback impedance CCR.

The control unit 34 receives the digital output signal Vs1_cmp corresponding to the result of reading the first memory cell on completion of the previous step.

The third step (iii) involves a step of adjusting, by the control unit 33, the first reference voltage VREF_cmp by adjusting the amplitude of the first reference voltage according to the result of the previous reading step. If the read data is x1=0, the control unit 33 is configured to keep the first reference voltage VREF_cmp at its current state, i.e. VREF1 in this case. If the read data is x1=1, the control unit 33 is configured to adjust the amplitude of the first reference voltage VREF_cmp to the next amplitude level in the series of N amplitudes VREF1 to VREF3.

Following this adjustment step, the read step ii) is repeated for the second input memory cell $CM_2$. It should be noted that the initial configuration of the processing circuit 3 before the step of reading the second input memory cell $CM_2$ depends on the logic value read in the first input memory cell $CM_1$. Two scenarios are then possible:
- if x1=0, the first reference voltage VREF_cmp is kept at VREF1 and the reading step ii) of the second input memory cell $CM_2$ is identical to that described for the first input memory cell $CM_1$;
- if x1=1, the first reference voltage VREF_cmp is biased to VREF2. This allows the comparator 32 to be configured to switch to a high logic state following the accumulation of an amount of charges equal to $2 \times Q_1$ (if x1=1 and x2=1), but also allows a low digital output signal to be generated following the accumulation of an amount of charge equal to $1 \times Q_1$ (if x1=1 and x2=0).

Then, the step of adjusting (iii) the first reference voltage VREF_cmp is repeated. After reading the content of the second input memory cell $CM_2$, the control unit reacts as follows:
- if x1=1 and x2=1, the first reference voltage VREF_cmp is adjusted to the next amplitude level from among the series of N amplitudes, i.e. VREF_cmp=VREF3;
- if x1=1 and x2=0, the first reference voltage VREF_cmp is kept at the current amplitude level from among the series of N amplitudes, i.e. VREF_cmp=VREF2;
- if x1=0 and x2=0, the first reference voltage VREF_cmp is kept at the current amplitude level from among the series of N amplitudes, i.e. VREF_cmp=VREF1.

Similarly, following this second iteration of the adjustment step, the reading step ii) is repeated for the third input memory cell $CM_3$.

From an analogue perspective, each logic combination of data corresponds to an amount of charge accumulated in the capacitive feedback impedance CCR. On completion of the N iterations of steps ii) and iii), the capacitive element Cap1 stores an amount of charge equal to $k \times Q_1$, with k being the number of input memory cells containing logic data in a "1" high state. The tables in FIGS. 2c and 2d illustrate the charge state of the capacitive feedback impedance following three iterations of the reading (ii) and adjustment (iii) steps for the three input memory cells.

The next step involves a step of adjusting the first reference voltage VREF_cmp according to the type of logic operation in order to generate a digital output signal Vs1_cmp corresponding to the result of the logic operation.

For example, if the logic operation to be carried out is of the AND type, this amounts to generating a digital output signal Vs1_cmp=1 only when x1=x2=x3=1. This corresponds to detecting the accumulation of an amount of charge of $3 \times Q_1$ in the capacitive feedback impedance CCR on completion of three successive read operations. Thus, in order to carry out an AND type logic operation, the control unit 34 is configured to bias the first reference voltage VREF_cmp to the amplitude corresponding to the minimum level VREF3. Thus, the output of the comparator 32 only switches to a high logic state when Vs1_ao=VREF0−VCCR<VREF3.

The amplitude of the reference voltage VREF3 is the minimum amplitude from among VREF1 to VREF3. The minimum amplitude VREF3 is used to detect a maximum amplitude variation of the analogue output voltage Vs1_ao. Indeed, the more charges accumulated in the capacitive feedback impedance CCR, the lower the voltage Vs1_ao=VREF0−VCCR. Therefore, the minimum amplitude VREF3 is the amplitude of the reference voltage for which the comparator 32 is able to detect the variation in the amplitude of the analogue output voltage Vs1_ao.

Alternatively, if the logic operation to be carried out is of the OR type, this amounts to generating a digital output signal Vs1_cmp=0 only when x1=x2=x3=0. This corresponds to detecting the accumulation of a quasi-zero amount of charge of $Q_0$ in the feedback capacitive impedance CCR on completion of three successive read operations. Thus, in order to carry out an OR type logic operation, the control unit 34 is configured to bias the first reference voltage VREF_cmp to the amplitude corresponding to the minimum level VREF1. Thus, the output of the comparator 32 only switches to a low logic state when Vs1_ao=VREF0−VCCR<VREF1.

Elementary logic operations were thus carried out with N operands stored in memory cells of the memory array in the storage circuit itself.

Advantageously, it is possible to carry out more complex logic operations (of the exclusive OR type, for example) using the same operating principle based on accumulating charges combined with controlling the threshold voltage of the comparator 32.

Figure 3A:
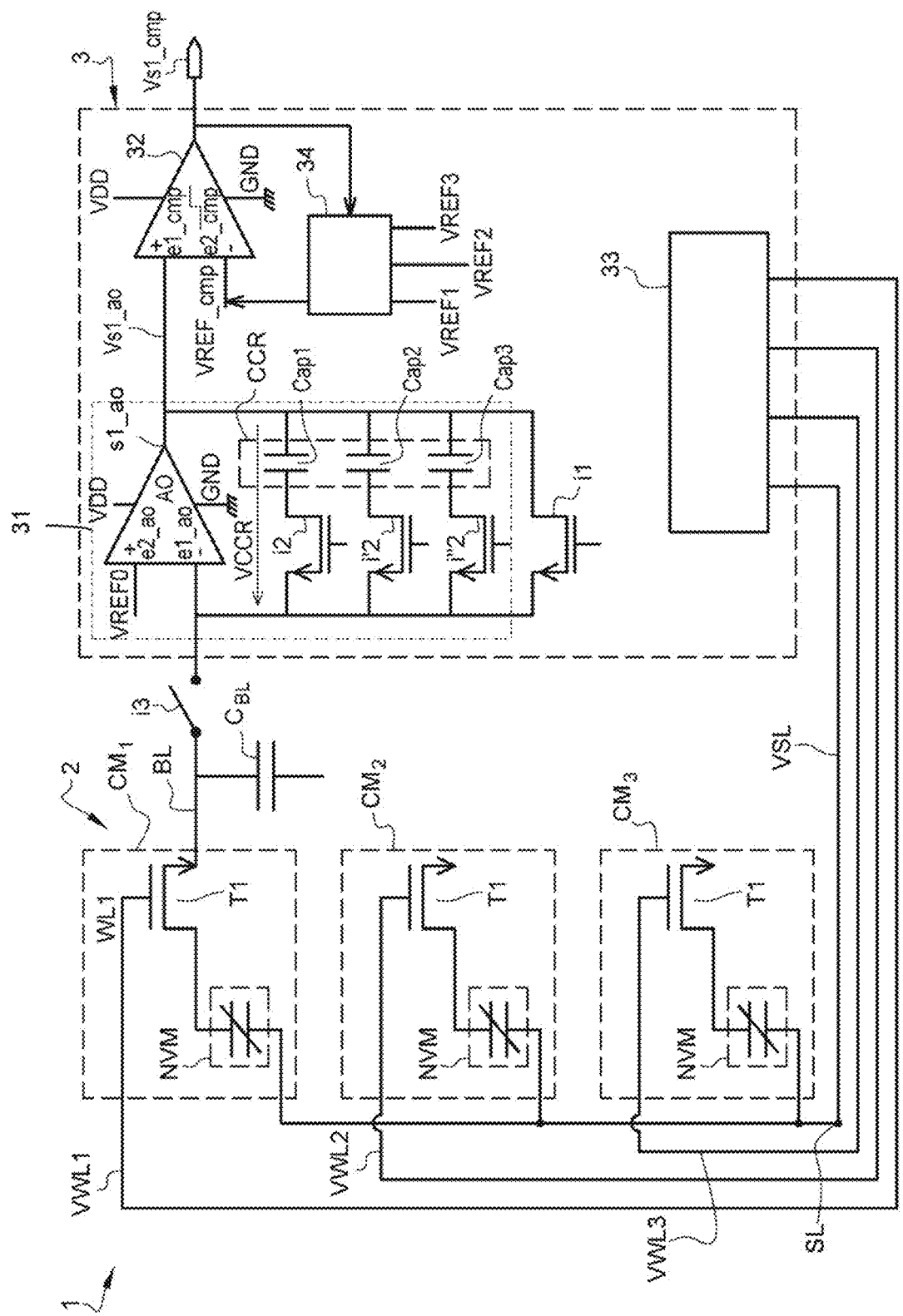
FIG. 3a illustrates an electric diagram of a second embodiment of the processing circuit according to the invention connected to N=3 variable electric biasing ferroelectric memory cells.

FIG. 3a illustrates an electric diagram of a second embodiment of the processing circuit 3 according to the invention connected to N=3 variable electric biasing ferroelectric memory cells. Structurally, the second embodiment differs from the first embodiment in terms of the implementation of the capacitive feedback impedance CCR. Indeed, in the illustrated case, the capacitive feedback impedance CCR is implemented by a plurality of capacitive elements Cap1, Cap2 and Cap3 mounted in parallel between the output s1_ao and the first input e1_ao of the operational amplifier AO.

For each capacitive element from among Cap1, Cap2 and Cap3, the processing circuit 3 further comprises a feedback activation switch (i2, i2' and i2", in this case produced by transistors) between the associated feedback capacitive element and the first input e1_ao of the operational amplifier. Thus, during a read operation, each capacitive feedback element is dedicated to receiving the charges supplied by an associated input memory cell. Let Q be the amount of charge supplied by an input memory cell that stores a datum in a high logic state. The first capacitive element Cap1 is able to receive an amount of charge that is less than or equal to $1 \times Q$, the second capacitive element Cap2 is able to receive an amount of charge that is less than or equal to $2 \times Q$, and the third capacitive element Cap3 is able to receive an amount of charge that is less than or equal to $3 \times Q$.

Thus, when the processing circuit 3 is configured to carry out an elementary logic operation implementing 3 operands, the feedback activation switch i" associated with the third capacitive element Cap3 is closed and the other two feedback activation switches i and i' are open. The electric connection is established between the third capacitive element Cap3 and the second input/output node BL common to the input memory cells.

Similarly, if the number of operands is equal to 2, the connection is established between the second capacitive element Cap2 and the second input/output node BL common to the input memory cells.

In the case whereby the processing circuit 3 is configured to carry out only a data read operation from an input memory cell, the first capacitive element Cap1 is sufficient. Thus, the processing circuit 3 is configured to select the first capacitive element Cap1 to receive the charges supplied by the input memory cell to be read.

Thus, this embodiment allows the value of the capacitance of the capacitive feedback impedance to be adapted to the number of operands of the elementary logic operation to be carried out.

Figure 3B:
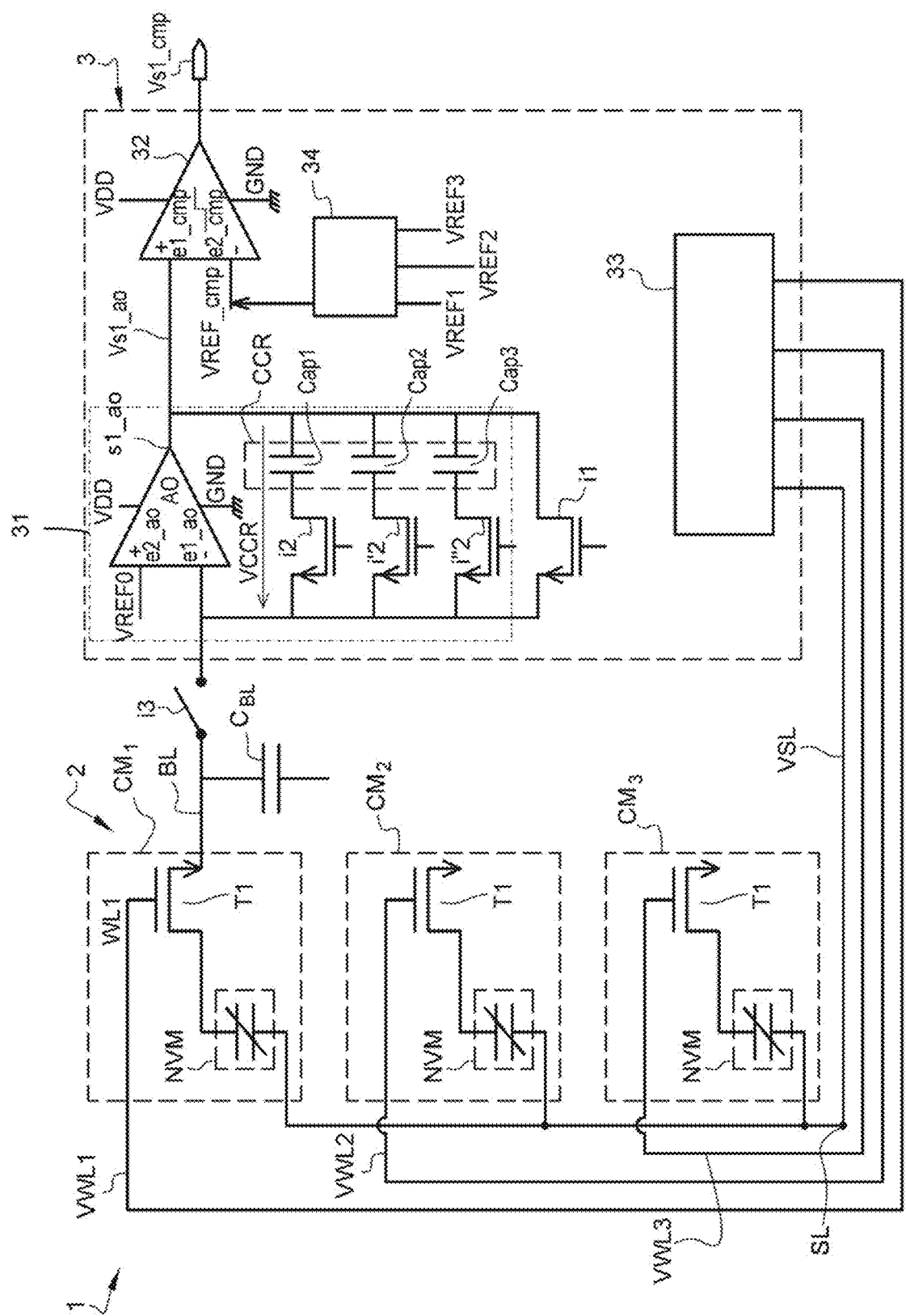
FIG. 3b illustrates an electric diagram of a third embodiment of the processing circuit according to the invention connected to N=3 variable electric biasing ferroelectric memory cells.

FIG. 3b illustrates an electric diagram of a third embodiment of the processing circuit 3 according to the invention connected to N=3 variable electric biasing ferroelectric memory cells. The third embodiment differs from the second embodiment in terms of the size of the capacitive elements Cap1, Cap2 and Cap3.

Indeed, each capacitive element from among Cap1, Cap2 and Cap3 has a capacitance that is greater than or equal to that of the elementary component of an input memory cell. Each capacitive element from among Cap1, Cap2 and Cap3 is able to receive an amount of charge that is greater than or equal to 1×Q. The first capacitive element Cap1 is intended to receive charges supplied by the first input memory cell $CM_1$ when it is read. The second capacitive element Cap2 is intended to receive charges supplied by the second input memory cell $CM_2$ when it is read. The third capacitive element Cap3 is intended to receive charges supplied by the third input memory cell $CM_3$ when it is read.

Figure 3C:
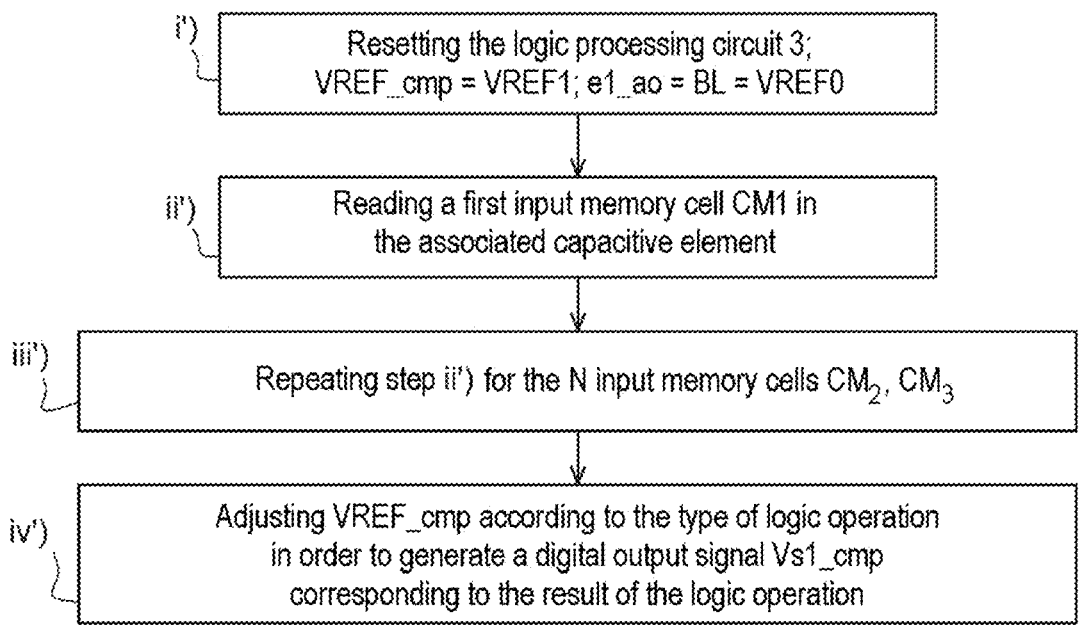
FIG. 3c illustrates the operating steps of the processing circuit according to the third embodiment of the invention for carrying out an elementary logic operation.

FIG. 3c illustrates the operating steps of the processing circuit according to a third embodiment of the invention for carrying out an elementary logic operation.

The first step (i') is a reset step identical to the reset step in FIG. 2a.

The next step (ii') involves reading the first input memory cell $CM_1$ while selecting only the first capacitive element Cap1. The reading mechanism remains the same as that previously described. The result is the accumulation of charges provided by the first input memory cell $CM_1$ in the first capacitive element Cap1.

The next step involves reading the second input memory cell $CM_2$ while selecting only the second capacitive element Cap2. The reading mechanism remains the same as that previously described. The result is the accumulation of charges provided by the second input memory cell $CM_2$ in the second capacitive element Cap2.

The next step involves reading the third input memory cell $CM_3$ while selecting only the third capacitive element Cap3. The reading mechanism remains the same as that previously described. The result is the accumulation of charges provided by the third input memory cell $CM_3$ in the third capacitive element Cap3.

The advantage of this embodiment is that there is no need to adjust the amplitude of the first adjustable reference voltage VREF_cmp according to the read result. This is possible by virtue of the distribution of charges resulting from successive read operations on separate capacitive elements.

The last step iv') involves a step of adjusting the first reference voltage VREF_cmp according to the type of logic operation in the same way as described above. During this step, all the switches i2, i2' and i2" are in the on-state in order to assess all the amounts of charges distributed over the three capacitive elements.

In the next section, an embodiment of the invention will be described that allows the problem of destructive reading of variable electric biasing ferroelectric memories to be addressed. Indeed, during a read access phase, the elementary component NVM receives an electric read voltage on the upper electrode so as to overwrite it to a low logic state (x=0). The dynamics of the transition following the application of the read voltage are then seen. If the electric dipoles of the central layer are previously biased with an orientation in a "positive" direction (x=1), a relatively large amount of electric charge will be emitted by the device during the transition. Conversely, if the electric dipoles of the central layer are previously biased with an orientation in a "negative" direction (x=0), the amount of charge delivered during the transition is lower. As a result, the read procedure involves estimating the amount of charge emitted when biasing to a low logic state (x=0) and therefore erases the logic value of the stored data.

Within this context, one problem to be addressed is the destruction of the logic content of a variable electric biasing ferroelectric memory cell following a read operation.

Figure 4A:
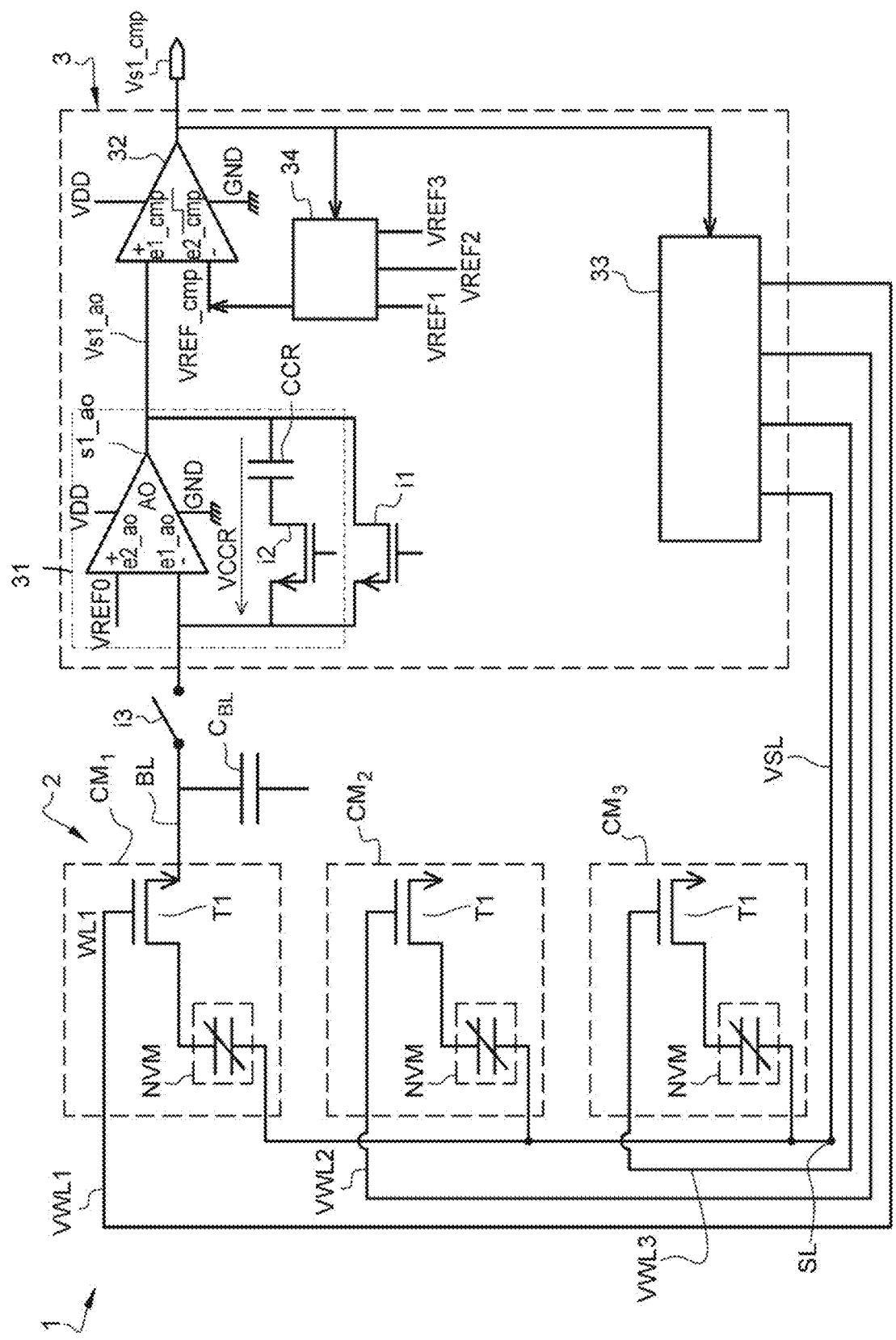
FIG. 4a illustrates an electric diagram of a fourth embodiment of the processing circuit according to the invention connected to N=3 variable electric biasing ferroelectric memory cells.

FIG. 4a illustrates an electric diagram of a fourth embodiment of the processing circuit 3 for addressing the problem of destructive reading.

In this embodiment, the sequencer 33 receives the digital output signal Vs1_cmp so as to set up a feedback loop allowing a rewrite operation to be carried out by the read circuit itself. This allows the problems of destructive reading to be overcome without complicating the circuit. In addition, the action of the sequencer allows the rewriting to be carried out without transferring the data to external buffer memories.

Figure 2B:
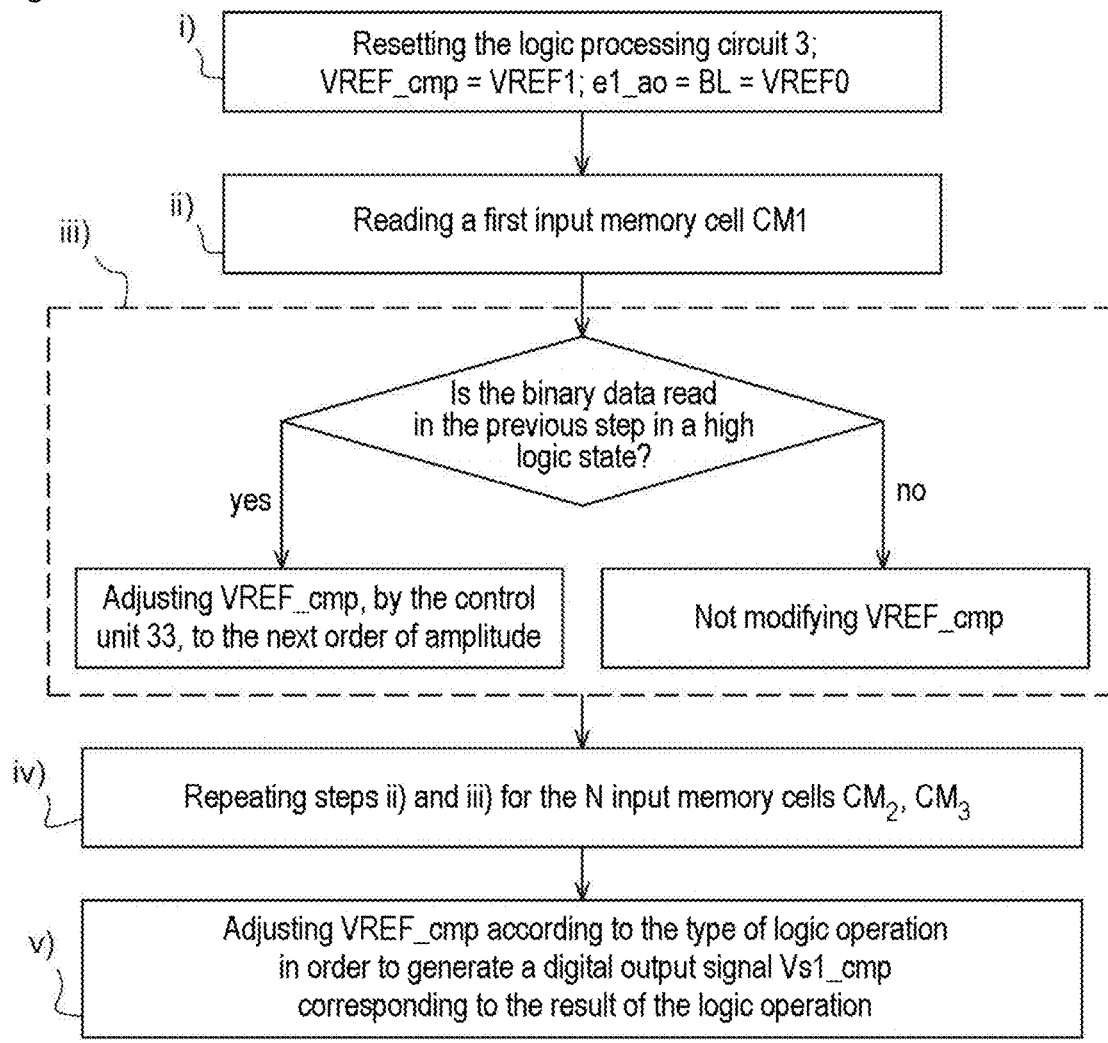
FIG. 2b illustrates the operating steps of the processing circuit according to the first embodiment of the invention for carrying out an elementary logic operation.
Figure 4B:
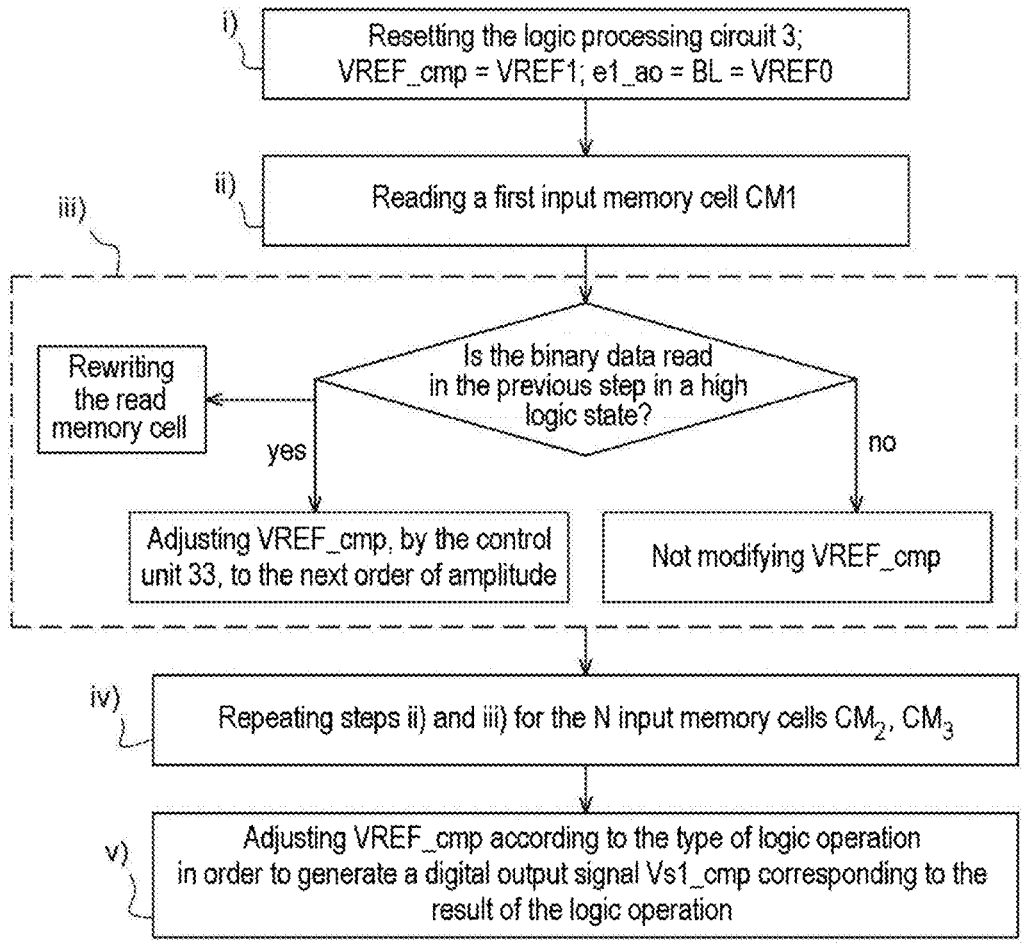
FIG. 4b illustrates the operating steps of the processing circuit according to the fourth embodiment of the invention for carrying out an elementary logic operation.

FIG. 4b illustrates the operating steps of the processing circuit 3 according to the fourth embodiment. The illustrated method differs from that described in FIG. 2b by the addition of a rewrite step after each read operation depending on the logic result of said operation. It should be noted that the rewrite operation is only required if the read data corresponds to a high logic state. The sequence of a rewrite step applied to an input memory cell will now be described.

Figure 4C:
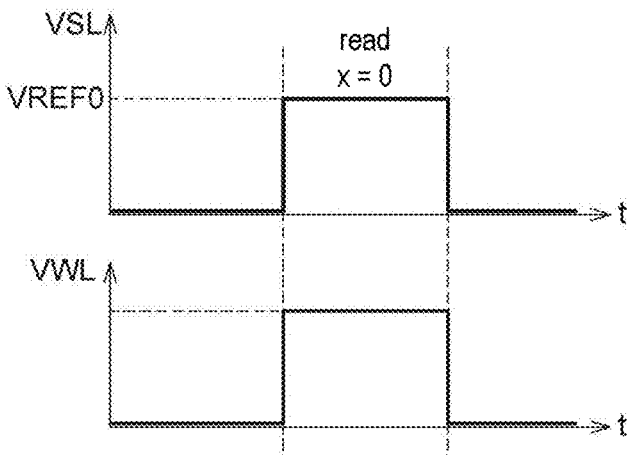
FIG. 4c illustrates a flowchart of the control signals for the memory cell after the processing circuit reads a low logic state (x=0) according to the fourth embodiment of the invention.

FIG. 4c shows a flowchart of the control signals for the input memory cell after a low logic state (x=0) is read by the processing circuit 3. In this case, the sequencer 33 receives the digital output signal Vs1_cmp=0. In response to this result, the sequencer 33 is configured to simultaneously emit a falling edge on the nodes SL and WL of the memory cell being read. This allows the elementary component NVM to be isolated from the node BL and maintains the logic state of said elementary component at x=0 that is acquired following the read operation (by charge pumping during the read operation).

Figure 4D:
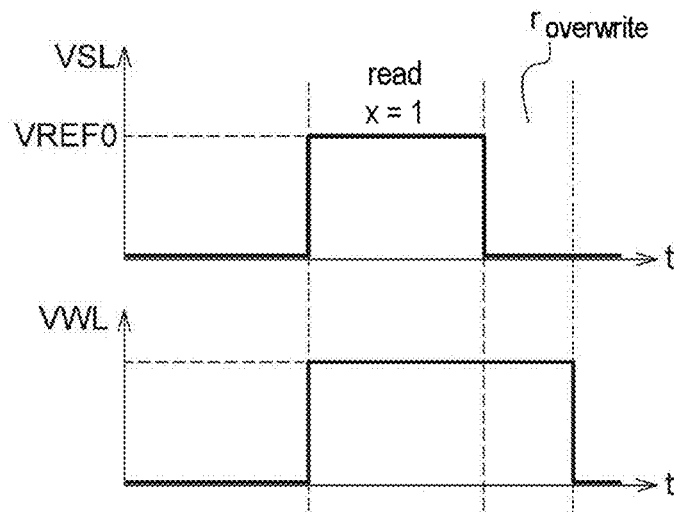
FIG. 4d illustrates a flowchart of the control signals for the memory cell after the processing circuit reads a high logic state (x=1) according to the fourth embodiment of the invention.

Alternatively, FIG. 4d illustrates a flowchart of the control signals for the input memory cell after a high logic state (x=1) is read by the processing circuit 3. In this case, the sequencer 33 receives the digital read signal Vs1_cmp=VDD (x=1). In response to this result, the sequencer 33 is configured to apply a falling edge to the input/output node SL while keeping the selection node WL in a high state. This results in the following combination:
- on the one hand, the first input/output node SL is at a low potential (preferably zero) under the action of the sequencer 33;
- on the other hand, the second input/output node BL is at a high electric potential equal to VREF0 under the action of the operational amplifier AO, with the transistor T1 being in the on-state.

This corresponds to the application of a write voltage SET to the elementary component NVM, as explained in FIG. 1a. Thus, a rewrite operation for the logic value x=1 was carried out via the action of the sequencer 33, allowing a rewrite operation to be carried out by the read circuit itself. This allows the problems of destructive reading to be overcome without complicating the circuit.

Figure 5:
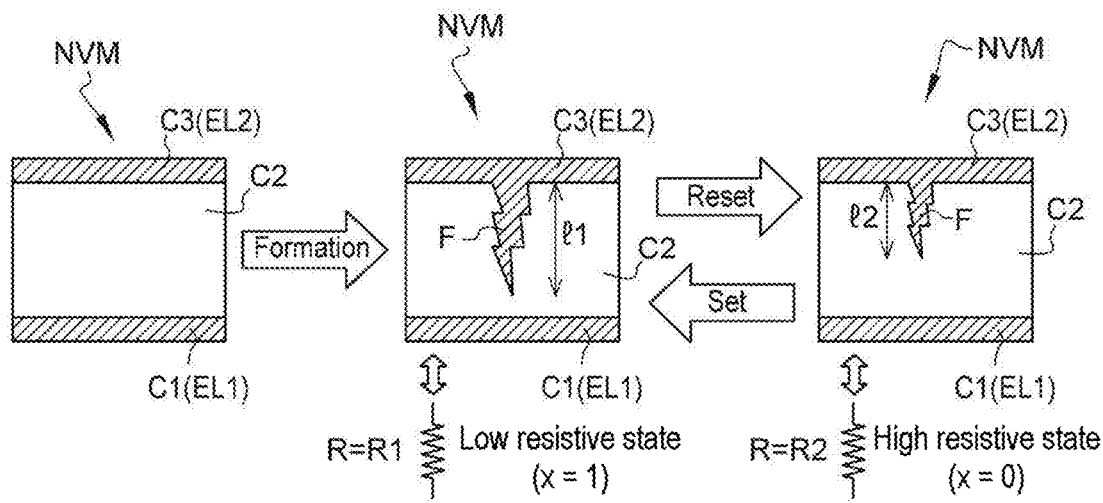
FIG. 5 illustrates a cross-sectional view of an example of an elementary component of a variable conductive filament resistive memory cell compatible with the invention.

The invention will now be described within the context of a storage circuit with variable conductive filament resistive type memories. FIG. 5 shows a structural example of an elementary component NVM of a variable conductive filament resistive memory cell compatible with the invention.

Variable conductive filament resistive operation requires the formation of a conductive filament F through at least part of the electrically insulating central layer C2.

Initially, the elementary component NVM is an MIM (Metal-Insulator-Metal) type structure with infinite resistance between the two electrodes EL1 and EL2. In order to reconfigure the elementary component NVM for resistive memory operation, the filament F must be formed from the upper electrode EL2 through at least part of the volume of the central layer C2. Forming the filament allows variable resistance to be acquired by modulating the length l of the conductive filament that is formed. In order to form the filament, an electric formation voltage is applied to the upper electrode EL2. The electric formation voltage has a high enough amplitude and/or duration to cause oxygen gaps to be generated in the central layer C2. Indeed, the applied electric formation voltage must exceed a predetermined value so as to extract oxygen ions from the crystal lattice of the central metal oxide layer, which will migrate towards the upper electrode EL2 and thus form a conductive filament F through the central layer made up of the oxygen gaps.

Once the conductive filament F has been formed, the behaviour of a resistive element is acquired with a resistance R that varies according to the length l of the conductive filament F. When a positive electric voltage is applied to the lower electrode EL1, the opposite reaction occurs and oxygen ions fill some of the oxygen gaps forming the conductive filament. This results in a reduction in the length of the conductive filament. Thus, the resistance of the resistive element increases. This is referred to as a high resistance state and a RESET type write operation. Conversely, when a positive electric voltage is applied to the upper electrode EL2, the length of the conductive filament F increases by the same mechanism described for the wire forming operation. Thus, the resistance of the resistive element decreases. This is referred to as a low resistive state and a SET type write operation.

The following convention is selected by way of an example: when a memory component NVM is configured to store a binary datum in the high logic state (x=1), a write electric voltage is temporarily applied to the upper electrode EL2 (SET operation) so as to acquire a low resistive state. Conversely, when a memory component NVM is configured to store binary data in the low logic state (x=0), a write electric voltage is temporarily applied to the lower electrode EL1 (RESET operation) so as to acquire a high resistive state.

Reading a resistive memory component NVM involves estimating the resistance between the upper electrode and the lower electrode and comparing it with a threshold value in order to determine whether the resistive state is a high or a low state.

Figure 6A:
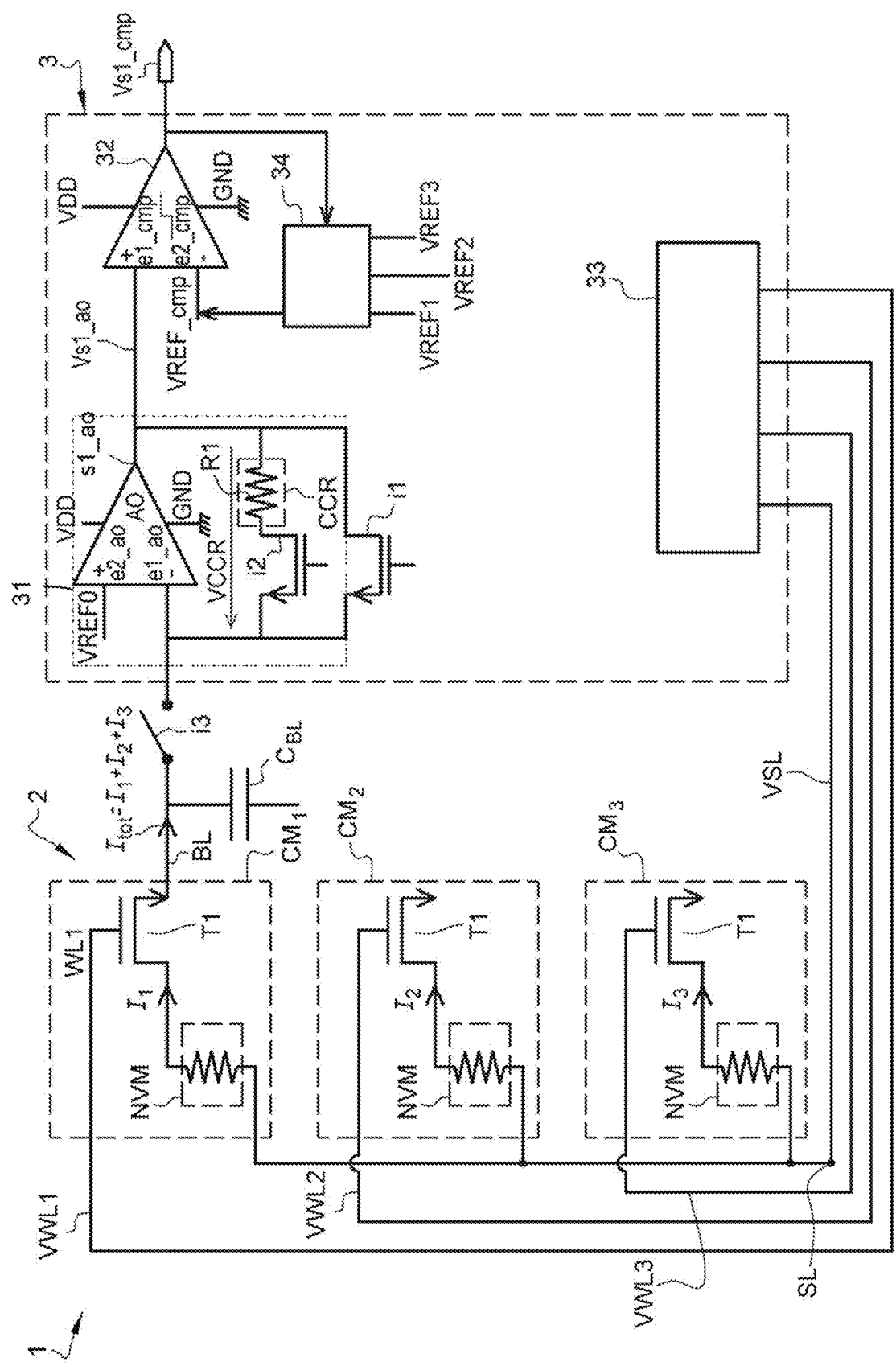
FIG. 6a illustrates an electric diagram of a fifth embodiment of the processing circuit according to the invention connected to N=3 variable conductive filament resistive memory cells.

FIG. 6a shows an electric diagram of a fifth embodiment of the processing circuit 3 connected to N=3 variable conductive filament resistive memory cells. In this case, the feedback impedance CCR is provided by at least one feedback resistor R1 connected in parallel between the output s1_ao and the first input e1_ao of the operational amplifier AO. Advantageously, the read circuit 3 comprises a second feedback activation switch i4 between the feedback resistive impedance RCR and the first input e1_ao of the operational amplifier AO.

FIG. 6b illustrates the operating steps of the processing circuit 3 according to the fifth embodiment of the invention for carrying out an elementary logic operation.

The first reset step a) remains unchanged compared to the other embodiments.

The second step b) involves reading the input memory cells $CM_1$, $CM_2$, $CM_3$. The selection transistors T1 of the input memory cells are simultaneously or sequentially set to the on-state. The sequencer 33 is then configured to apply a positive read control signal VSL to their first input/output nodes SL. The amplitude of the positive read control signal VSL is greater than that of the second reference signal VREF0 (potential of the second node BL). Each of the resistive elementary components NVM is then subjected to a non-zero potential difference. This results in an electric current I1 to I3 flowing through the resistor NVM. This results in the addition of currents $I_{tot}$=I1+I2+I3 in the feedback resistor R1. The strength of the total current $I_{tot}$ depends on the number of input memory cells storing data in a high logic state (x=1). This induces a variation in the voltage VRCR at the terminals of the resistive feedback impedance RCR that depends on the strength of the current $I_{tot}$. This results in a variation in the electric potential at the output node s1_ao of the operational amplifier AO.

The last step c) involves adjusting the amplitude of the first reference voltage VREF_cmp according to the type of logic operation in order to generate a digital output signal Vs1_cmp corresponding to the result of the logic operation. This step remains unchanged compared to the other embodiments of the invention described above.

The invention claimed is:
1. A data storage circuit comprising:
an array of memory cells (CMij) such that each memory cell ($CM_{ij}$) comprises:
  a non-volatile elementary storage component (NVM) having a first electrode (EL1) and a second electrode (EL2);
  a first input/output node (SL) connected to the second electrode (EL2), a second input/output node (BL), a selection node (WL); and
  a selection transistor (T1) having a gate connected to the selection node (WL) and linking the first electrode (EL1) to the second input/output node (BL);
a logic processing circuit configured to carry out a logic operation having N binary data (x1, x2, x3) as operands stored in N input memory cells ($CM_1$, $CM_2$, $CM_3$), with N≥2, the second input/output nodes (BL) of said input memory cells ($CM_1$, $CM_2$, $CM_3$) being linked by a common bit line, the logic processing circuit comprising:
  a transimpedance amplifier stage configured to supply an analogue read signal (Vs1_ao) from the voltage of the common bit line (BL), said capacitive transimpedance amplifier stage comprising:
    an operational amplifier (AO) having: a first input (e1_ao) connected to the second input/output node (BL) of the input memory cells, and a second input (e2_ao) for receiving a second reference voltage (VREF0), and an output (s1_ao) for supplying said analogue read signal (Vs1_ao);

a feedback impedance (CCR) mounted between the output (s1_ao) and the first input (e1_ao) of the operational amplifier;

a comparator intended to compare the analogue read signal (Vs1_ao) with a first adjustable reference voltage (VREF_cmp) in order to generate a digital output signal (Vs1_cmp) corresponding to the result of the logic operation; and a control unit configured to adjust the reference voltage (VREF_cmp) to an amplitude selected from among N distinct predetermined amplitudes (VREF1, VREF2, VREF3), depending on the type of logic operation; and wherein:

the feedback impedance (CCR) is a capacitive impedance and the elementary storage components (NVM) of the input memory cells ($CM_1$, $CM_2$, $CM_3$) are of variable electric biasing ferroelectric type; or the feedback impedance (CCR) is a resistive impedance and the elementary storage components (NVM) of the input memory cells ($CM_1$, $CM_2$, $CM_3$) are of variable conductive filament resistive type.

2. The data storage circuit according to claim 1, further comprising a sequencer configured to apply:

a write and read control signal (VSL) to the first input/output node (SL) of each of the input memory cells ($CM_1$, $CM_2$, $CM_3$); and a selection signal (VWL1, VWL2, VWL3) to the selection node (WL) of each of the input memory cells ($CM_1$, $CM_2$, $CM_3$).

3. The data storage circuit according to claim 1, wherein the first input/output nodes (SL) of said input memory cells ($CM_1$, $CM_2$, $CM_3$) are linked by a common source line.

4. The data storage circuit according to claim 1, wherein the logic processing circuit further comprises a reset switch (i1) mounted between the output (s1_ao) and the first input (e1_ao) of the operational amplifier.

5. The data storage circuit according to claim 1, wherein when the feedback impedance (CCR) is a capacitive impedance and when the elementary storage components (NVM) of the input memory cells ($CM_1$, $CM_2$, $CM_3$) are of the variable electric biasing ferroelectric type, each memory cell can have a first ("0") or a second ("1") logic state respectively corresponding to different levels of charges stored in the associated elementary storage component (NVM).

6. The data storage circuit according to claim 5, wherein each elementary storage component (NVM) of the input memory cells ($CM_1$, $CM_2$, $CM_3$) has a first predetermined capacitance, and wherein the feedback impedance (CCR) is a capacitive element (C1) having a second capacitance that is more than N times said first predetermined capacitance.

7. The data storage circuit according to claim 6, wherein the N predetermined amplitudes (VREF1, VREF2, VREF3) are ordered in descending order, and wherein the logic processing circuit is configured to carry out a logic operation by executing the following steps:

i) a step of resetting for discharging the capacitive element (C1), biasing the first input (e1_ao) of the operational amplifier to the second reference voltage (VREF0) and adjusting the first reference voltage (VREF_cmp) to the maximum amplitude from among the N predetermined amplitudes (VREF1);

ii) a step of reading a first input memory cell ($CM_1$) by setting its selection transistor (T1) to the on-state and applying a read control signal (VSL) to its first input/output node (SL) having an amplitude substantially equal to the second reference voltage (VREF0) so as to generate a transfer of charges from the elementary storage component (NVM) of the selected memory cell to its associated capacitive element (C1);

iii) a step of adjusting, by the control unit, the first reference voltage (VREF_cmp) by adjusting the amplitude of the first reference voltage to the next order of amplitude (VREF2) from among the N predetermined amplitudes when the binary data read in the previous step is in a high logic state;

iv) repeating steps ii) and iii) for the N input memory cells ($CM_2$, $CM_3$); and v) a step of adjusting, by the control unit, the first reference voltage (VREF_cmp) to a predetermined value, according to the type of logic operation, from among the N amplitudes in order to generate a digital output signal (Vs1_cmp) corresponding to the result of the logic operation.

8. The data storage circuit according to claim 5, wherein each elementary storage component (NVM) of the input memory cells ($CM_1$, $CM_2$, $CM_3$) has a first predetermined capacitance, and wherein the feedback impedance (CCR) is provided by N capacitive elements (C1, C2, C3) mounted in parallel, with each capacitive element (C1, C2, C3) being associated with an input memory cell ($CM_1$, $CM_2$, $CM_3$) and having a second capacitance greater than or equal to said first predetermined capacitance.

9. The data storage circuit according to claim 8, wherein the logic processing circuit is configured to carry out a logic operation by executing the following steps:

i') a step of resetting for discharging the capacitive elements (C1, C2, C3), biasing the first input (e1_ao) of the operational amplifier to the second reference voltage (VREF0) and adjusting the first reference voltage (VREF1, VREF2, VREF3) to the maximum amplitude from among the N predetermined amplitudes;

ii') a step of reading a first input memory cell ($CM_1$) by setting its selection transistor (T1) to the on-state and applying a read control signal (VSL) to its first input/output node (SL) having an amplitude substantially equal to the second reference voltage (VREF0) so as to generate a transfer of charges from the elementary storage component (NVM) of the selected memory cell to its associated capacitive element (C1);

iii') repeating step ii') for the N input memory cells ($CM_2$, $CM_3$); and iv') a step of adjusting the first reference voltage (VREF_cmp) to a predetermined value, according to the type of logic operation, from among the N amplitudes in order to generate a digital output signal (Vs1_cmp) corresponding to the result of the logic operation.

10. The data storage circuit according to claim 5, wherein the sequencer circuit is configured so as to apply, after reading a datum corresponding to the second logic state ("1") in a selected memory cell, a control signal (VSL) to the first input/output node (SL) of said selected memory cell, having an amplitude below the second reference voltage (VREF0) and keeping the selection transistor (T1) of the selected memory cell in an on-state so as to restore, in its elementary storage component (NVM), a charge level corresponding to the second logic state ("1").

11. The data storage circuit according to claim 2, wherein said first logic state ("0") corresponds to an uncharged state of an elementary storage component (NVM), and wherein said sequencer circuit is such that, after reading a datum corresponding to a first logic state ("0"), said sequencer circuit is configured to make said selection transistor (T1) of the selected memory cell non-conductive before changing the control signal (VSL) on the first input/output node (SL) to a new value, in order to keep the memory cell that has just been read in an uncharged state.

12. The data storage circuit according to claim 5, wherein the elementary storage component (NVM) of an input memory cell (CM$_1$, CM$_2$, CM$_3$) is of the FeRAM type or of the ferroelectric tunnel junction (FTJ) type.

13. The data storage circuit according to claim 1, wherein, when the feedback impedance (CCR) is a resistive impedance and wherein the elementary storage components (NVM) of the input memory cells (CM$_1$, CM$_2$, CM$_3$) are of the variable conductive filament resistive type, the logic processing circuit is configured to carry out a logic operation by executing the following steps:
   a) a step of resetting for biasing the first input (e1_ao) of the operational amplifier to the second reference voltage (VREF0) and adjusting the first reference voltage (VREF_cmp) to the maximum amplitude (VREF1) from among the N predetermined amplitudes;
   b) a step of reading the input memory cells (CM$_1$, CM$_2$, CM$_3$), by setting their selection transistors (T1) to the on-state simultaneously or sequentially, and by applying a positive read control signal (VSL) to their first input/output nodes (SL); and
   c) a step of adjusting, by the control unit, the first reference voltage (VREF_cmp) to a predetermined value, according to the type of logic operation, from among the N amplitudes, in order to generate a digital output signal (Vs1_cmp) corresponding to the result of the logic operation.

14. The data storage circuit according to claim 7, wherein, during the step of adjusting the first reference voltage (VREF_cmp) according to the type of logic operation, and
   the control unit is configured to adjust the first reference voltage (VREF_cmp) to the minimum amplitude (VREF3) from among the N predetermined amplitudes when the logic operation is of the AND type.

15. The data storage circuit according to claim 7, wherein, during the step of adjusting the first reference voltage (VREF_cmp) according to the type of logic operation,
   the control unit is configured to adjust the first reference voltage (VREF_cmp) to the maximum amplitude (VREF1) from among the N predetermined amplitudes when the logic operation is of the OR type.

* * * * *

UNITED STATES PATENT AND TRADEMARK OFFICE
CERTIFICATE OF CORRECTION

PATENT NO. : 12,437,792 B2
APPLICATION NO. : 18/373231
DATED : October 7, 2025
INVENTOR(S) : Olivier Billoint et al.

Page 1 of 1

It is certified that error appears in the above-identified patent and that said Letters Patent is hereby corrected as shown below:

In the Claims

In Claim 1, Column 16, Line 41, "memory cell ($CM_{ij}$) comprises:" should be --memory cell ($CM_{ij}$) comprises:--.

Signed and Sealed this
Sixth Day of January, 2026

John A. Squires
*Director of the United States Patent and Trademark Office*